United States Patent [19]

Hanning

[11] 4,017,225
[45] Apr. 12, 1977

[54] APPARATUS FOR THE PRODUCTION OF SYNTHETIC-RESIN BODIES HAVING CORE AND SKIN OF DIFFERENT DENSITY

[75] Inventor: Robert Hanning, Campione d'Italia, Italy

[73] Assignee: Societa Internazionale per lo Sfruttamento di Brevetti S.A., Panaman, Panama

[22] Filed: Apr. 29, 1975

[21] Appl. No.: 572,713

Related U.S. Application Data

[62] Division of Ser. No. 507,465, Sept. 19, 1974.

[30] Foreign Application Priority Data

Sept. 19, 1973 Switzerland ................... 13479/73
Feb. 20, 1974 Switzerland ................... 2334/74
Apr. 29, 1974 Switzerland ................... 5812/74

[52] U.S. Cl. ................ 425/4 R; 264/DIG. 83; 425/130; 425/145; 425/197; 425/244; 425/817 R
[51] Int. Cl.² ........................................ B29D 27/00
[58] Field of Search ........... 264/328, 329, DIG. 83; 425/4 C, 4 R, 817 C, 817 R, 130, 133.1, 131.1, 244, 245, 242 R, 247, 251, 134, 198, 199, 197, 248, 145, 146; 259/4, 191; 222/145

[56] References Cited

UNITED STATES PATENTS

| | | | |
|---|---|---|---|
| 2,418,856 | 4/1947 | Stacy | 425/130 X |
| 3,339,240 | 9/1967 | Corbett | 425/130 |
| 3,696,179 | 10/1972 | Jacobs | 425/817 R X |
| 3,793,416 | 2/1974 | Finkmann et al. | 425/817 R X |
| 3,947,175 | 3/1976 | Melcher | 425/130 |

FOREIGN PATENTS OR APPLICATIONS 1,959,464 3/1971 Germany ................... 425/4 C

*Primary Examiner*—Robert L. Spicer, Jr.
*Assistant Examiner*—Mark Rosenbaum
*Attorney, Agent, or Firm*—Karl F. Ross; Herbert Dubno

[57] ABSTRACT

An apparatus for the production of injection-molded synthetic-resin bodies having core portions and skin portions of different densities wherein a blowing agent is introduced into the core material to form macroscopic bubbles or cavities therein within the mold and under the molding conditions so that the expanding body of core material presses the skin material against the walls of the mold. The core material is injected coaxially with the skin material but under conditions such that expansion under the effect of the macropore-producing blowing agent does not occur to any significant extent until the core material is within the mold.

3 Claims, 5 Drawing Figures

APPARATUS FOR THE PRODUCTION OF SYNTHETIC-RESIN BODIES HAVING CORE AND SKIN OF DIFFERENT DENSITY

This is a division of application Ser. No. 507,465, filed Sept. 19, 1974.

FIELD OF THE INVENTION

The present invention relates to the production of composite bodies in a single molding operation with a core of synthetic-resin material of one density and a skin completely enclosing the core and bonded thereto, but composed of synthetic-resin material of another density.

BACKGROUND OF THE INVENTION

The production of such composite bodies has been carried out heretofore in a number of different ways generally in a number of successive operations. The bodies have the advantage that they can be composed of a low-density core material, filler or the like, but are protected by a high density substantially fluid-impermeable skin which provides a smooth external surface of esthetic and protective value.

Such bodies are used in the production of cushions, furniture, vehicle-dashboard linings, padding etc.

One obvious technique for producing such bodies is to blow a parison of the thermoplastic synthetic-skin material into a mold and thereafter inject the core material which can be permitted to foam in situ. In another technique, the core material may be introduced first and a layer of the skin material can be introduced subsequently between the foamed core and the wall of a slightly larger mold cavity.

All of these systems and others which have been proposed have various disadvantages which have prevented widespread use in an economical manner. Some of the problems include reproducibility of the product, uniformity of the coating or density of the core material, etc.

OBJECTS OF THE INVENTION

It is the principal object of the present invention to provide an improved apparatus for producing composite bodies having a core of one density and a skin of another density from synthetic-resin material whereby the aforementioned disadvantages are obviated.

Another object of the invention is to provide an improved apparatus for the purposes described.

SUMMARY OF THE INVENTION

These objects and others which will become apparent hereinafter are attained, in accordance with the present invention, in a method of making synthetic-resin shaped bodies of a skin material and a core material by injection-molding whereby the skin material and the core material are at least in part introduced simultaneously in coaxial streams, the initial introduction of the skin material precedes that of the core material so that the core material is completely enclosed even at the inception of the injection-molding operation, the core material is then foamed or expanded to press the skin material against the wall of the mold, and a macropore-forming foaming agent is introduced into the core material and conditions are maintained such that substantially no significant expansion by this agent occurs until the core material has entered the mold.

When it is stated herein that the skin material should precede the core material into the mold, it is meant to define thereby a relationship such that either a mass of the skin material is disposed ahead of the incoming core material so that the core material is completely enclosed in a sheath of skin material, thereby ensuring a completely closed covering of the skin material about the core mterial, or the skin material is squeezed together and bonded ahead of the core material, thereby also ensuring a structure whereby the core material is completely enclosed in the skin material.

In general, the sheath of skin material enclosing the core material is closed at its leading end at least upon initial introduction of the synthetic-resin material into the mold, the skin material being spread at the closed end of the sheath and along the lateral portions thereof into contact with the mold walls so that the skin is continuous.

In one conventional technique for forming composite bodies of the type described, the core material constitutes a foamable synthetic resin provided with a commercial chemically-acting expanding agent. In this process, however, the synthetic-resin body has a more or less thick pore-free skin of skin material while the core material is formed with very fine substantially uniform microscopic pores.

Since the pores are small and proportionately considerable synthetic resin of the core material remains unfoamed between the pores, the specific gravity of the resulting body is not significantly lower than that of an unexpanded body.

To decrease the specific gravity it has been proposed to form macroscopic pores or large bubbles in the core material, but these techniques have not been successful because they have not been reproducible heretofore.

The term "microscopic pores" is used herein to describe pores having a diameter below about 1 mm and generally much smaller while the "macroscopic pores" or "bubbles" are pores whose diameter can be on the order of centimeters, i.e. more than 1 and up to several centimeters or more in diameter.

According to the invention, these problems are overcome by introducing into the core material a blowing agent which, under the thermodynamic parameters with which the mold operates, forms macroscopic bubbles, the core material is introduced with the bubble-forming agent through an injection nozzle and an injection passage coaxially with the skin material and the operation is carried out such that until the core material reaches the opening of the injection nozzle into the mold cavity, bubble formation is severely restricted or prevented.

When reference is made to the region of opening of the injection passages into the mold cavity, it is meant to include also any antechamber of the mold which widens toward the mold cavity and strictly would not otherwise be considered part of the mold cavity.

The invention is based upon the discovery that the formation of macropores in the core material (in a reproducible and uniform manner) requires fulfillment of two conditions. Firstly, the bubble formation in the core material should commence only when the core material is practically introduced into the mold cavity. In other words, premature expansion of the macropore blowing agent should be precluded. Secondly, the core material, which contains the macroblowing agent, should first pass against the skin material only when the core material is being expanded by the macropore foaming agent so that the skin material is urged into contact with the walls of the mold, in other words, premature outward pressing of the skin avoided.

When the core material comes into contact with the skin material within the nozzle under elevated pressure as produced by expansion of the macropore blowing agent, there occurs a detrimental mixing of the skin material and the core material.

It has been found that it is possible to provide both requirements when a special injection nozzle is provided which maintains the core material separate from the skin material at least until the materials have reached the outlet port of the nozzle or just prior to reaching the outlet port so that expansion of the macropore blowing agent is not yet effective.

To improve the passage of at least the skin material into the mold cavity with a minimum of distortion, the residual air in the mold cavity may be removed by evacuation prior to injection or discharged by venting simultaneously with injection.

The thermodynamic characteristics in the mold cavity are, to a significant extent, determined by the pressure therein and this can be modified by controlling the venting or evacuation of air from the cavity. Of course, the thermodynamic characteristics are, to a large measure, also determined by the temperature which can be controlled by regulating the temperature of the core material and skin material as they are introduced into the mold cavity.

According to another feature of the invention, the core material may also include, in addition to the bubble-forming macropore forming agent, chemical expanding agents capable of producing micropores upon expansion in the mold chamber. The core material may be preformed by this chemical micropore-forming agent, e.g. in a separate preforming chamber, before being introduced into the nozzle. It is also possible to foam the skin material with a conventional micropore chemical foaming agent within the mold cavity or even prior to introduction into the nozzle. Notwithstanding the microporous expansion of the skin material, the external surface is found to be free from bubbles or to be "closed" since this surface lies in contact with the smooth mold cavity wall. The high quality of the surface may be insured by operating with a micropore blowing agent capable of generating high pressures within the core material in the mold cavity. As macropore blowing agents, a number of substances may be used and indeed all conventional blowing agents capable of forming large bubbles upon introduction with the core material into the mold cavity but inhibited as to bubble formation while the core material is confined to the nozzle or prior thereto, may be employed successfully.

The thermoplastic material is, in accordance with the usual techniques current in injection-molding, masticated and plastified in a screw-type extruding press to an injection temperature $T_1$ and a supply pressure $P_1$ and delivered to an injection compartment from which the thermoplastic is forced into the molded cavity at a temperature $T_2$ and a pressure $P_2$. The pressure is thus reduced and the mass is cooled so that all vaporizable substances which at $T_1$ and $P_1$ are in a liquid state but at $T_2$ and $P_2$ are in a vapor state can be used as blowing agents. Of course, gases which have a relatively small volume at $T_1$ and $P_1$ and expand appreciably at $T_2$, $P_2$, may also be employed. The introduction of the macropore blowing agent, of course, must be carried out at a corresponding temperature and pressure.

The preferred macropore blowing agents are compressed gases which can be introduced into the core material or agents which can be introduced in granulate or particulate form and can release a vapor upon extrusion upon the core material. Granular carriers include woodships and particles and the preferred blowing agent in this case is water which is carried by (absorbed into) the woodchips. Cellularly bound water or mechanically absorbed water may be used and it is preferred to employ the wood particles in amounts between 30 and 60% by volume of the core material and with a moisture content of about 20%. Of course, depending upon the temperature to which the woodchips are subjected prior to and at expansion, distillation vapors of the wood itself may serve as the blowing gases. In general, the preferred blowing agents are water and/or water vapor introduced into the core material in an appropriate carrier or directly. The macropore blowing agent may be introduced continuously or intermittently (in pulses).

According to the invention, the macroblowing agent can be injected into the core material alone or in combination with additional core material through a needle piercing the skin after at least some core material has been injected into the mold cavity. Conversely such a needle can be used for drawing fluid from the mold.

The core material and the skin material may be different synthetic resins although, according to the invention, it is also possible to provide the core material and the skin material from the same synthetic resin. The latter technique requires only a single screw press for the plasticization and preparation of the material, the two streams being divided subsequently so that the macroblowing agent can be added to the core-material stream.

The above-described method and apparatus has the advantage that synthetic-resin bodies with a complete skin and a completely enclosed core can be made with macroscopic bubbles in the core material. The resulting bodies are extremely light and notwithstanding the high pore volume have high strength and uniform smooth surfaces. The apparatus is easily operated and of relatively simple and economical construction.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
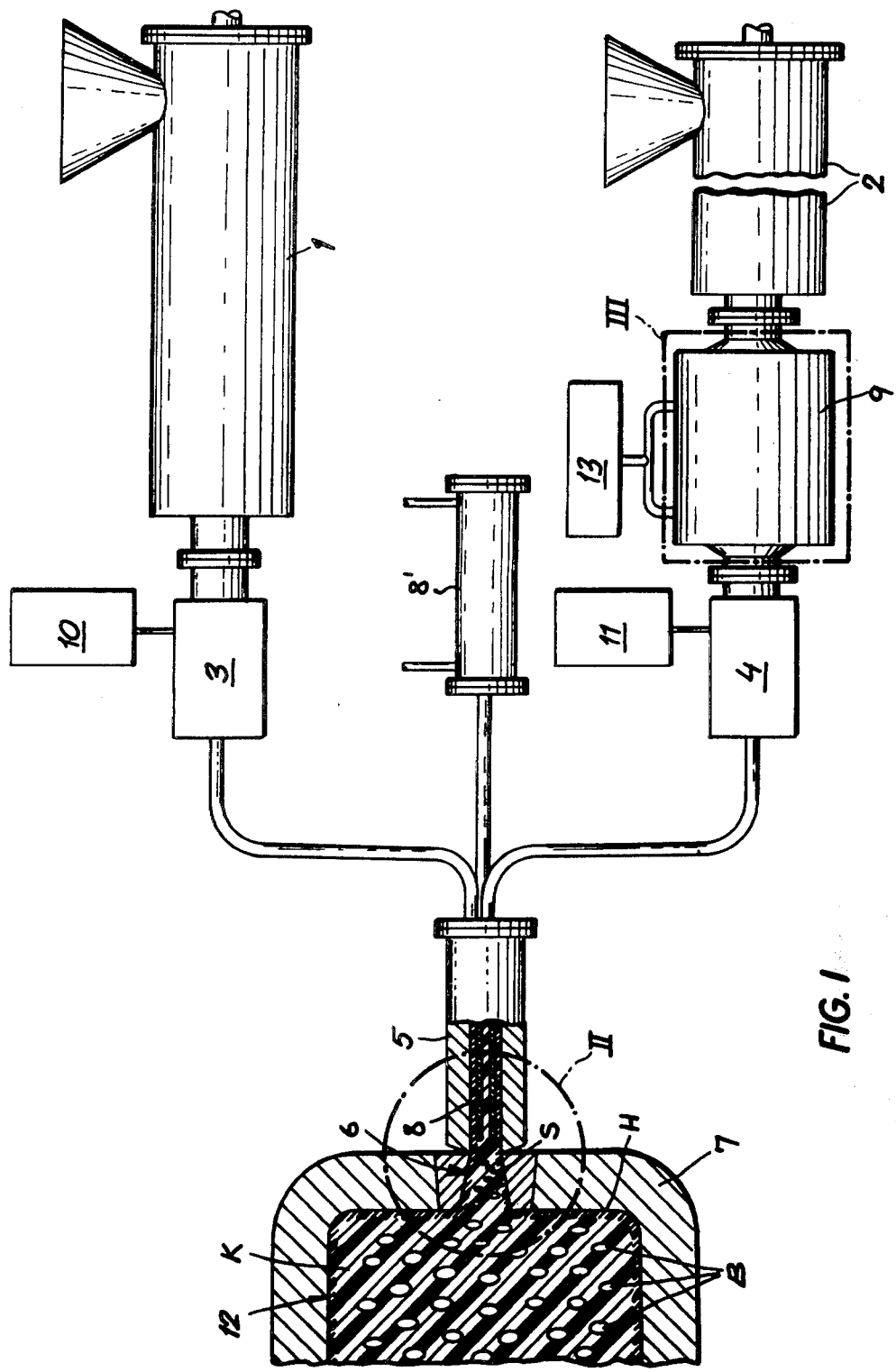
FIG. 1 is a flow diagram and partially elevational view of an apparatus for carrying out the present invention, with the injection nozzle and mold portion being shown somewhat in cross-section.

The apparatus shown in the drawing comprises basically a plasticization extruder 1 for masticating and plastifying the thermoplastic skin material, another worm or screw extruder 2 for plastifying and masticating (preparing) the thermoplastic core material, an injection device 3 for the skin material and an injection device 4 for the core material, both feeding an injection nozzle 5. The devices 3 and 4 may be mixing chambers equipped with rams for driving the injectable material into the nozzle. The devices 1, 2, 3 and 4 are conventional in the art and require no specific description.

The nozzle 5 is shown as a pair of coaxial tubes and is only a representative embodiment of a nozzle which may be used in accordance with the present invention. For example, disk nozzles, needle-closure nozzles and the like may also be employed.

The extruders 1 and 2 are screw or worm presses for synthetic resins of the type which conventionally convert the granular thermoplastic material into a homogeneous flowable stream using intrinsic heat of mastication alone or in addition to heat supplied from heating mantles.

The nozzle 5 opens into a conically widening injection passage 6 of an injection mold 7 and receives with all around clearance an injection tube 8 which terminates just ahead of the passage 6. Of course, the tube 8 may project somewhat beyond the end of nozzle 5 and may terminate within the passage 6 as required.

The tube 8 is designed to maintain the core material passing through the interior of this tube separate from the skin material passing through the exterior thereof so that mixing of the core material with the skin material does not occur until the core material has entered the injection passage 6 at which the foaming and macrobubble formation begins. The interior of the nozzle 8 is connected to the extruder 2 through its injector 4 while the space between the nozzles 5 and 8 is connected to the injector 3.

Figure 3:
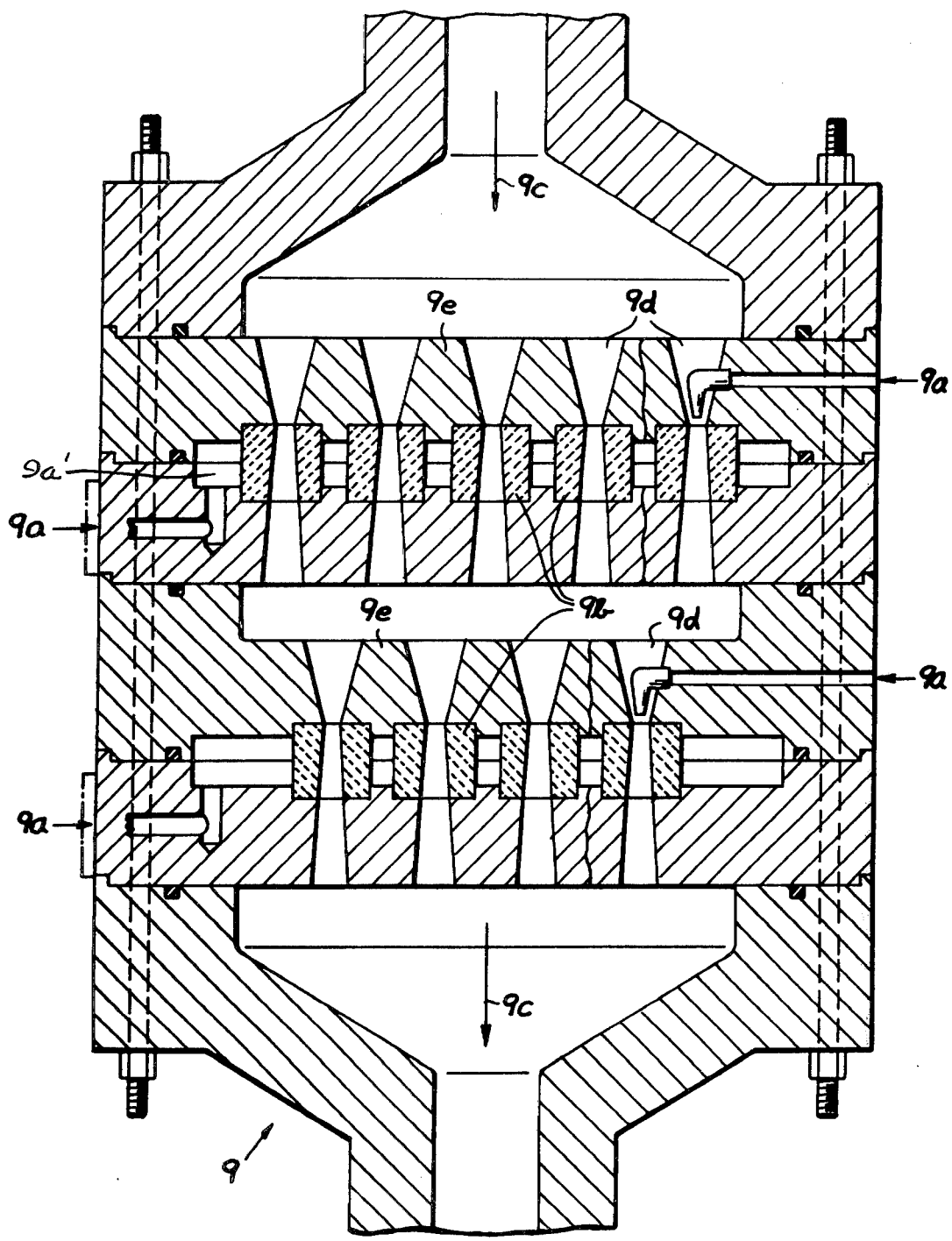
FIG. 3 is a cross-sectional view of the region outlined at III in FIG. 1.

Between the extruder 2 and the injector 4 for the core material there is provided a device 9 for introducing the macroblowing agent into the core material (see FIG. 3).

The macroblowing agent is supplied via passages 9a through porous sleeves 9b and into the orifices of the latter located just ahead of constrictions 9d in the form of perforations in plates extending perpendicular to the direction of flow (arrow 9c) of the synthetic-resin material. The synthetic resin in traversing the perforated plates 9a thus intimately mixes with the macroblowing agent. The passages 9a feed chambers 9a around the porous sleeves 9b.

In order to insure the maintenance of the thermodynamic parameters of the injection-moldable synthetic resin which the process of the injection requires, the injection devices 3 and 4 for the skin material and the core material, respectively, are provided with control systems to adjust the skin material flow rate, the core material flow rate and the quantities and pressures required.

The controllers 10 and 11 allow a relationship to be established for the core material such that there is substantially no bubble formation until the core material emerges from the nozzle 8.

Upon entry of the strand H of the skin material the parison thereof is completely closed at its leading end and forms a sheath around and ahead of the core material K so that, upon expansion, the mold will be completely lines by the skin material. Only when the streams S of synthetic resin enter the mold cavity does macrobubble formation occur (see FIG. 2). A controller 13, e.g. a metering pump similar to the fuel injector pump of an automotive vehicle Diesel engine, does the macroblowing agent into the mixing device 9 at the required rate so that bubble formation does not occur until the emergence of the core material from the tube 8.

The injection nozzle or tube 8 is axially shiftable by a cylinder 8' to allow it to be disposed at different depths within the mold cavity 12 or the diverging passage 6.

The injection nozzle or tube 8 can be provided with a further coaxial thin nozzle through which additional blowing agent (pressurizable gas, steam or the like) may be fed and with a servomechanism or positioning device so that the nozzle 8 is withdrawn during the course of injection and in the rhythm thereof.

Figure 2:
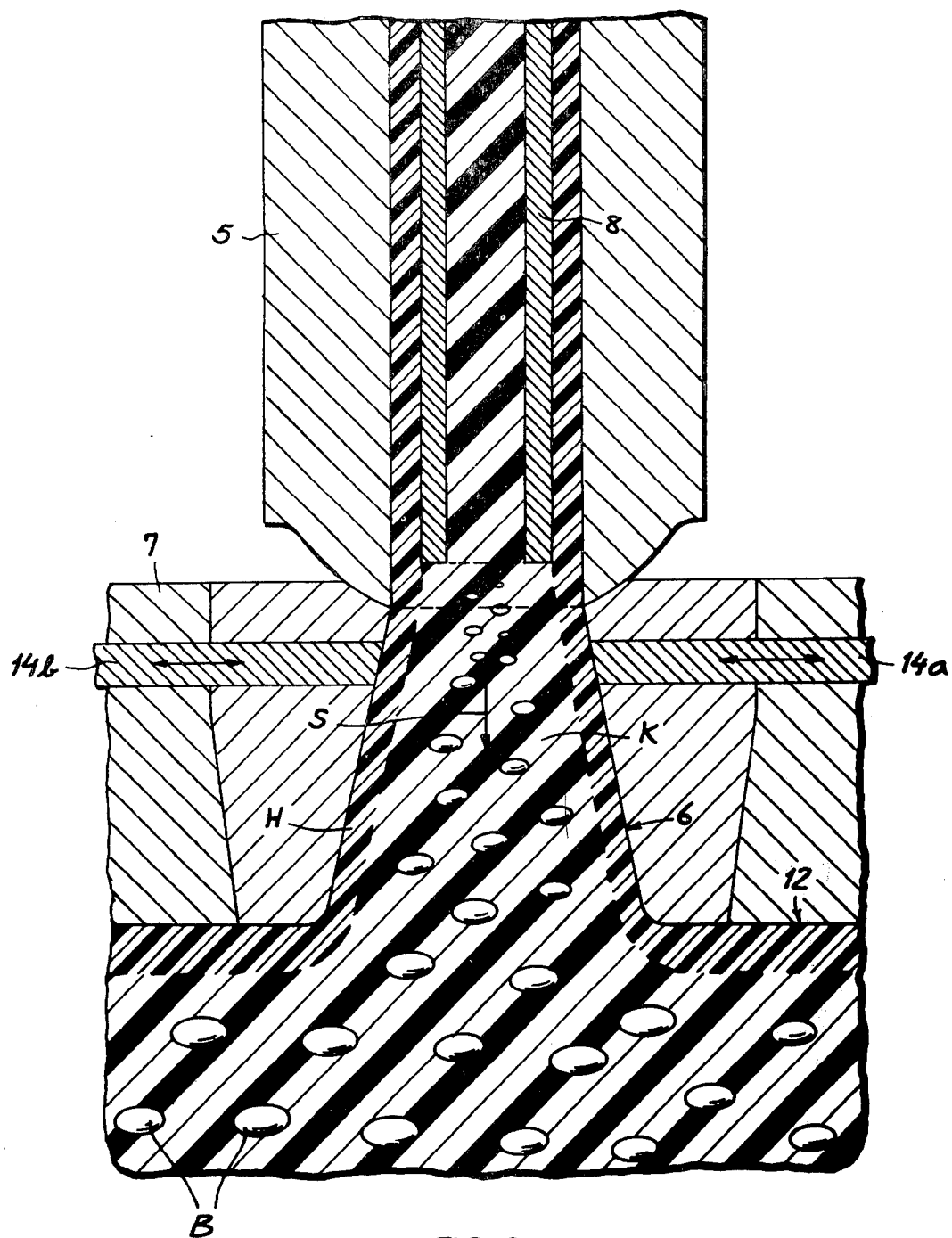
FIG. 2 is a cross-sectional view of the region corresponding to that encircled at II of FIG. 1 for a modified mold in which the strands of material can be pinched off to close the skin at the injection-molding site.
Figure 4:
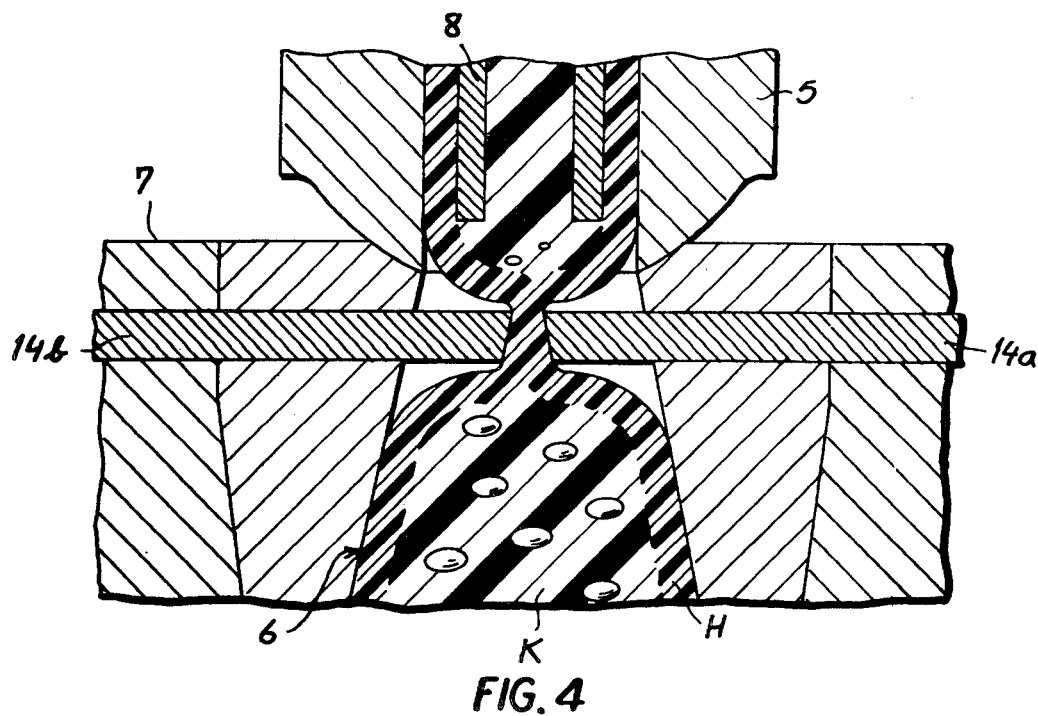
FIG. 4 is a view of parts of the mold of FIG. 2 in the position in which the strand of skin material is pinched off.

FIG. 2 also shows that a pair of pinching members 14a and 14b can flank the passage 6 to close the skin material (see FIG. 4) and at the same time form a pocket ahead of the core material for the next injection stage.

Figure 5:
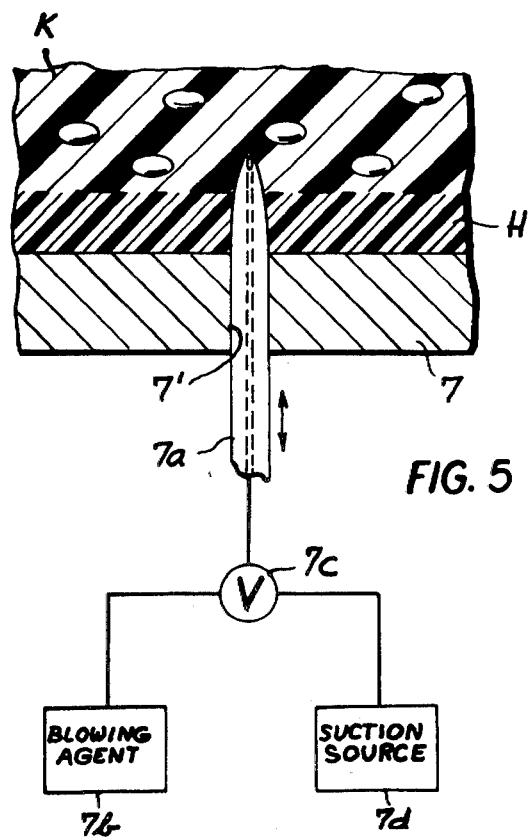
FIG. 5 is a cross-sectional view showing the use of a needle for injecting the macroblowing agent into a mold of the type shown in connection with FIGS. 1 – 3.

As can be seen from FIG. 5, the mold cavity 7 may be provided with a venting orifice 7' through which a hollow needle 7a can be inserted to pierce the skin H and inject blowing agent from a source 7b via a valve 7c into the core material K. A suction source 7d may, alternatively, be connected with the needle by the valve 7c to evacuate the mold cavity of gases, e.g. air which might disturb the injection process. During the expansion of the core material K, the skin material is driven against the walls of the mold cavity 12 and macroscopic bubbles B are formed, thereby producing a composite light-weight high-strength body as previously described. The system has been found to be especially advantageous with polyvinyl chlorides.

I claim:

1. An apparatus for producing a synthetic resin body consisting of a homogeneous skin material and a pore-containing core material, said apparatus comprising:
   a first plasticating extruder for producing a first flowable synthetic resin adapted to form said skin material;
   means forming a mold cavity having an injection orifice;
   a first injection-molding device connected to said first plasticating extruder for injecting said skin material along the walls of said cavity through said orifice;
   a second plasticating extruder adjacent said first plasticating extruder for producing a second flowable synthetic resin forming said core material;
   a second injection-molding device connected to said second plasticating extruder for injecting said core material into said cavity through said orifice in a stream simultaneously with said first synthetic resin material and surrounded thereby to form the core of the body in said cavity;
   a common injection nozzle communicating with both said extruders and traversed by said streams, said nozzle being formed with means maintaining a separation of said streams substantially until they reach said orifice;
   at least one perforated plate in the path of said second stream and formed with a multiplicity of porous-wall passages traversed by said second stream;

pressure means operatively associated with said passages for forcing a macroblowing agent through the porous walls of said passages to distribute said macroblowing agent in the synthetic resin of said second stream whereby said macroblowing agent expands within said mold cavity to produce gas bubbles therein;

first and second control means connected respectively to said first and second injection-molding devices for controlling the rates of flow and pressures of the respective streams of synthetic resin traversing said orifice; and further control means connected to said pressure means for regulating the flow of said macroblowing agent into said second stream independently of said first and second control means.

2. The apparatus defined in claim 1 wherein said further control means is a monitoring pump.

3. The apparatus defined in claim 1 wherein said means maintaining said separation of said streams in said nozzle is a tube, said apparatus further comprising means operatively associated with said tube for axially adjusting the position of said tube in said nozzle.

* * * * *